United States Patent [19]

Kahn

[11] 4,131,765

[45] Dec. 26, 1978

[54] METHOD AND MEANS FOR IMPROVING THE SPECTRUM UTILIZATION OF COMMUNICATIONS CHANNELS

[76] Inventor: Leonard R. Kahn, 137 E. 36 St., New York, N.Y. 10016

[21] Appl. No.: 816,661

[22] Filed: Jul. 18, 1977

Related U.S. Application Data

[63] Continuation-in-part of Ser. No. 713,046, Aug. 9, 1976, abandoned.

[51] Int. Cl.² .............................................. H04B 1/66
[52] U.S. Cl. ........................... 179/15.55 R; 179/15 AS
[58] Field of Search ...... 179/15 BW, 15 AS, 15.55 R, 179/15.55 T; 360/22

[56] References Cited

U.S. PATENT DOCUMENTS

| | | | |
|---|---|---|---|
| 2,388,001 | 10/1945 | Loughren | 179/15 AS |
| 3,389,225 | 6/1968 | Myers | 179/15 BW |
| 3,412,218 | 11/1968 | Comerci | 360/22 |
| 3,424,869 | 1/1969 | Anderson et al. | 179/15 AS |
| 3,832,491 | 8/1974 | Sciulli et al. | 179/15 AS |

*Primary Examiner*—Kathleen H. Claffy
*Assistant Examiner*—Kenneth A. Chayt

[57] ABSTRACT

A system and method for improving the spectrum utilization of communications channels.

In certain embodiments of the invention a plurality of narrowband communications channels are used to transmit a multiplicity of speech signals.

In another embodiment of this invention, a multiplicity of speech signals jointly utilize a common transmission facility and circuitry shifts the amount of bandwidth assigned to each channel as a function of the short term characteristics of the individual speech signal.

Special circuitry is provided to reduce the loss of consonant sounds at the initiation of speech bursts as well as the end of the bursts.

12 Claims, 5 Drawing Figures

METHOD AND MEANS FOR IMPROVING THE SPECTRUM UTILIZATION OF COMMUNICATIONS CHANNELS

RELATED APPLICATION

This application is a continuation-in-part of my co-pending application, Ser. No. 713,046, filed Aug. 9, 1976, now abandoned entitled Method and Means for Improving the Spectrum Utilization of Narrowband Channels.

BACKGROUND OF THE INVENTION

Possibly the most basic limitation in the transmission of information is the limitation caused by finite bandwidth transmission circuits. For example, in the field of radio telephony and conventional telephony, due to the cost of wide bandwidth circuits and limitations in radio spectrum, voice channels are generally restricted to 300 to 3,000 Hz even though components of speech extend below 100 Hz and above 5,000 Hz. Actually, some speech sounds, such as S's and H's, are readily confused when transmitted over conventional telephone circuits because the spectrum of such sounds exceeds the high frequency limit of 3,000 Hz.

Furthermore, if speech sounds are to be natural, pleasant to listen to, and not fatiguing, components below 300 Hz must be audible.

A prior invention, U.S. Pat. No. 3,684,838, discusses one means for improving the low frequency characteristics of a telephone line. There are a number of other techniques, such as U.S. Pat. Nos. 2,576,115 and 3,696,298 which teach one how to utilize two low quality telephone circuits to improve speech and music quality by approximately doubling the bandwidth of the system. The use of two lines is, of course, more expensive than one line.

Systems have also been developed for expanding or contracting the time duration of speech sounds and while such techniques are most useful when it is necessary to conform to tight time schedules, say, during a news broadcast, such systems alter the naturalness and may even degrade intelligibility.

It is also well known that one can transmit music or speech or video information, at say half speed, if one is willing to take twice the time to transmit the intelligence. There are two limitations to such a technique:

(1) They are not "real" time systems and therefore are not suitable for use with normal conversations; and, (2) when the transmission speed is reduced to two-to-one this also reduces the frequency of the low frequency components by 2-to-1 exacerbating the problem of low frequency transmission.

Numerous patents, including U.S. Pat. Nos. 1,836,824, 1,948,973, 2,014,081 and 2,306,425 disclose means for reducing the bandwidth of toll grade voice circuits.

Some of these techniques cause perceptible distortion or upset the temporal relationship of voice or video signals.

One system which has been successfully used to improve the spectrum utilization of communications channels in the TASI (Time Assignment Speech Interpolation) system. In this system a number of telephone circuits share a lesser number of transmission channels. The improvement in spectrum utilization is accomplished by assigning a channel to a circuit only when short term analysis indicates speech is present in the circuit. Thus, channel space is not wasted during idle speech periods.

One of the most difficult problems facing designers of TASI systems is the determination of the presence of speech. As pointed out in the textbook, "Introduction to Signal Transmission", McGraw-Hill Book Company, New York, 1970, by W. R. Bennett, pages 74 to 76, setting the threshold of a TASI speech presence detector is a compromise between loss of weak speech sounds and false operation by background noise. While the procedures described in U.S. Pat. No. Re. 27,202 and patent application Ser. No. 693,716 can be used to ease this problem, it is still somewhat difficult to accommodate the large differences in speech levels often experienced in practical telephone operation.

While the invention is subject to a wide range of applications, it is especially suited for transmission of telephone signals and will be particularly described in that connection.

SUMMARY OF INVENTION

A general object of the instant invention is to provide means for improving the spectrum utilization of communications channels.

A further object of the present invention is to allow the transmission of a number of telephone signals over a minimum number of communications channels.

A still further object is to improve the reliability of communications systems.

Another object of the invention is to allow the use of a relatively small number of telephone channels to be used to handle a larger number of telephone signals. An additional object is to improve the efficiency of TASI systems.

One embodiment of this invention would vary the bandwidth of the transmission facility assigned to one of a group of speech waves as a function of its present spectrum. Thus, a number of speech circuits would share a wide bandwidth facility and transmission segments would be made available to each circuit as a function of need. This embodiment is based upon the assumption that there is little probability of a large percentage of the speakers over a shared wide bandwidth circuit attempting to utter a phrase having a high frequency characteristic simultaneously. Thus, it would be improbable for 100 speakers to voice an "s" sound simultaneously.

In this specification, and in the associated claims, a narrowband communications channel means any communications channel, including wire and radio channels, which is narrower than the full bandwidth of the waves which are fed to it. For example, even a voice circuit having a response of 100 to 5,000 Hz, which is appreciably better in response than conventional voice grade lines, is narrowband because it does not pass all of the components of speech.

The term "spectrum utilization" efficiency, as used herein, means the efficiency of the system in using the bandwidth of the transmission channel to transmit signal spectrum components. A system that can transmit two signals, with a 300 to 3,000 Hz quality, is more efficient than one that can transmit only 300 to 3,000 Hz over the same channel.

The present invention may be used for transmitting two or more voice signals wherein the voice signals are momentarily disconnected during idle instants. The system makes use of means for determining the presence of speech sounds and circuitry for providing an appreciable hang time of the presence indication. The presence determining means are connected to control switching circuitry so as to provide a transmission channel for the consonant speech sounds.

Also provided are means for delaying the speech waves for a period at least long enough for a listener to hear initial consonant sounds. The delay means are to be connected between a point where the speech presence determination means is connected and the point where the switching circuitry is connected. Typically, the hang time would be in the order of 100 to 350 ms above the amount of time delay provided by the time delay means. Typically, the time delay means is between approximately 40 and 250 ms. The means for transmitting the consonant sounds generally would require a frequency response extending no lower than 1,000 Hz.

A further embodiment of the invention, for improving spectrum utilization, utilizes a multiplicity of communications channels. These channels would have at least two types of frequency characteristics and would be used to transmit a multiplicity of communications signals. The steps of this method are as follows:

(a) determining the frequency characteristic of the signals, (b) using the determination of Step (a) to match the assignment of the channels to individual signals so as to improve spectrum utilization of the channels, (c) transmitting information as to the assignments of Step (b) with said signals, and, (d) switching the output of the channels to the appropriate output circuits in accordance with the information transmitted in Step (c).

One variation of this last method utilizing a multiplicity of communications channels would use three types of channels having a low frequency, high frequency response, and a channel having both high and low frequency response characteristics. For example, the three types of response characteristics could be 300 to 1,500 Hz, 1,500 to 3,000 Hz, and a channel having both high and low frequency response; for example, 300 to 3,000 Hz.

Another embodiment of this invention is also used for transmitting voice waves and would use means for determining the short term frequency characteristics of the voice wave and would incorporate means for transmitting weak consonant sounds that precede or follow the main speech burst. These means would be used to control the selection of one circuit from a multiplicity of transmission circuits. The transmission circuits would have significantly different frequency response characteristics; some circuits designed to pass high frequency sounds, others designed to pass low frequency sounds, and still others to pass both high and low frequency sounds. For example, some of the transmission circuits would cover the frequency range of 300 to 1,500 Hz; others, 1,500 to 3,000 Hz, and still other lines would cover the total voice grade response of 300 to 3,000 Hz. These values are for typical voice grade circuits. The invention may also be used for higher grade service; for example, 100 to 5,000 Hz and in this case one embodiment would use lines covering a range of 100 to say 2,500 Hz and another segment from 2,500 to 5,000 Hz and another group of lines covering the full 100 to 5,000 Hz.

Incorporated in the equipment would also be means for determining the presence of voice waves and circuitry for disabling transmission paths during periods of when the voice wave was not present. Also provided is means for gating in relatively frequency limited transmission circuits for delayed speech when the speech presence detector determines speech is present in underlayed speech, and shortly after the speech detector indicates that speech is no longer present. This feature insures against the loss of low amplitude consonant sounds, intermingled with higher intensity sounds, which may not be strong enough to activate the speech presence detector circuitry. The period after the speech has ceased and which the equipment should provide a path for weak sounds would be approximately 100 to 350 ms.

Since these weak consonant sounds generally are in the high frequency network range, the path provided need only pass the high frequency band of a typical voice channel; for example, above 1 kHz.

Another embodiment of the invention would incorporate the following elements:

(a) a source of voice electrical signals, (b) a signal analysis circuit suitable for determining the short term requirements of the transmission facilities to efficiently transmit the voice signals, (c) a time delay circuit with its input connected to the (a) source and its output connected to a multiplicity of gates, (d) said gates controlled by the (b) signal analysis circuit and whose individual outputs are fed to separate transmission lines having substantially different freqency response characteristics, (e) means for transmitting the control condition information of the gates to the receive end of the transmission system so as to switch the far end of the system accordingly, (f) a signal presence detector fed by the (a) source, (g) a hang time circuit connected to the signal presence detector so as to increase duration of signal presence indication, said hang time circuit not appreciably increasing the time for initiation of the signal presence indication; and, (h) means for controlling the gating circuit connected to the line most appropriate for transmitting consonant sounds, said controlling means connected to the output of the hang circuit so as to provide improved response to consonant sounds.

Since only one path for a voice signal is required at a given time, means may be provided for inhibiting the operation of gating circuit in paragraph (h) whenever a second transmission circuit is activated. The transmission circuit of (h) should generally be above 1 kHz and typically between 1,500 and 3,000 Hz. A suitable value of the time delay of (c) time delay circuit is in the order of 40 ms and the hang time circuit of (b) would generally be in the order of 200 ms.

A more elaborate arrangement utilizing this invention in the transmission of a multiplicity of telephone signals over a wideband transmision circuit, would use the following method steps:

(a) detecting the short term frequency characteristics of the individual telephone signals, (b) bandpass filtering the individual channels as a function of the Step (a) detection so as to ensure well confined bandwidths of each telephone signal, (c) modulating individual SSB suppressed carrier generators with the filtered telephone signals, (d) shifting the frequency of the suppressed carrier waves used in the SSB suppressed carrier generators of Step (c) in such a fashion as to produce a compact frequency multiplexed wave suitable for transmission over a transmission circuit; and, (e) generating a signal, suitable for transmission, containing processing information used in steps (b) and (d).

Normally, the (b) filtering steps can be at quantum steps; for example, in steps of for the low frequency edge of filter of 250, 800 and 1,500 Hz, and for the high frequency edge 1.8, 2.5, and 3.5 kHz. A suitable device for performing the (c) modulating step is a phase shift type SSB generator.

It is necessary to provide special receiving equipment for receiving the wave produced by the above described transmitting method and this receiving method would include the following steps:

(a) decoding the portion of the received signal containing the channel encoding information, (b) utilizing a portion of the decoded information resulting from the (a) step to determine and to reproduce the carrier frequencies of the individual telephone channels, (c) demodulating the individual SSB suppressed carrier signals with the reproduced carrier frequencies of Step (b); and, (d) filtering the demodulated waves with adjustable filters whose cutoff frequencies are set by part of decoded information resulting from (a).

In some applications of this invention it is desirable to utilize a plurality of narrowband lines for transmitting the speech waves rather than a single wideband line. In this case, the techniques described in U.S. Pat. No. 3,696,298 and patent application Ser. No. 621,669 would be applicable. In other words, additional processing of the multi-channel frequencies multiple wave and the control signal wave so as to make the wave suitable for transmission over narrowband lines would be required.

For a better understanding of the present invention, together with other and further objects thereof, reference is had to the following description, taken in connection with the accompanying drawings, while its scope will be pointed out in the appended claims.

DESCRIPTION OF THE PREFERRED EMBODIMENTS

Figure 1:
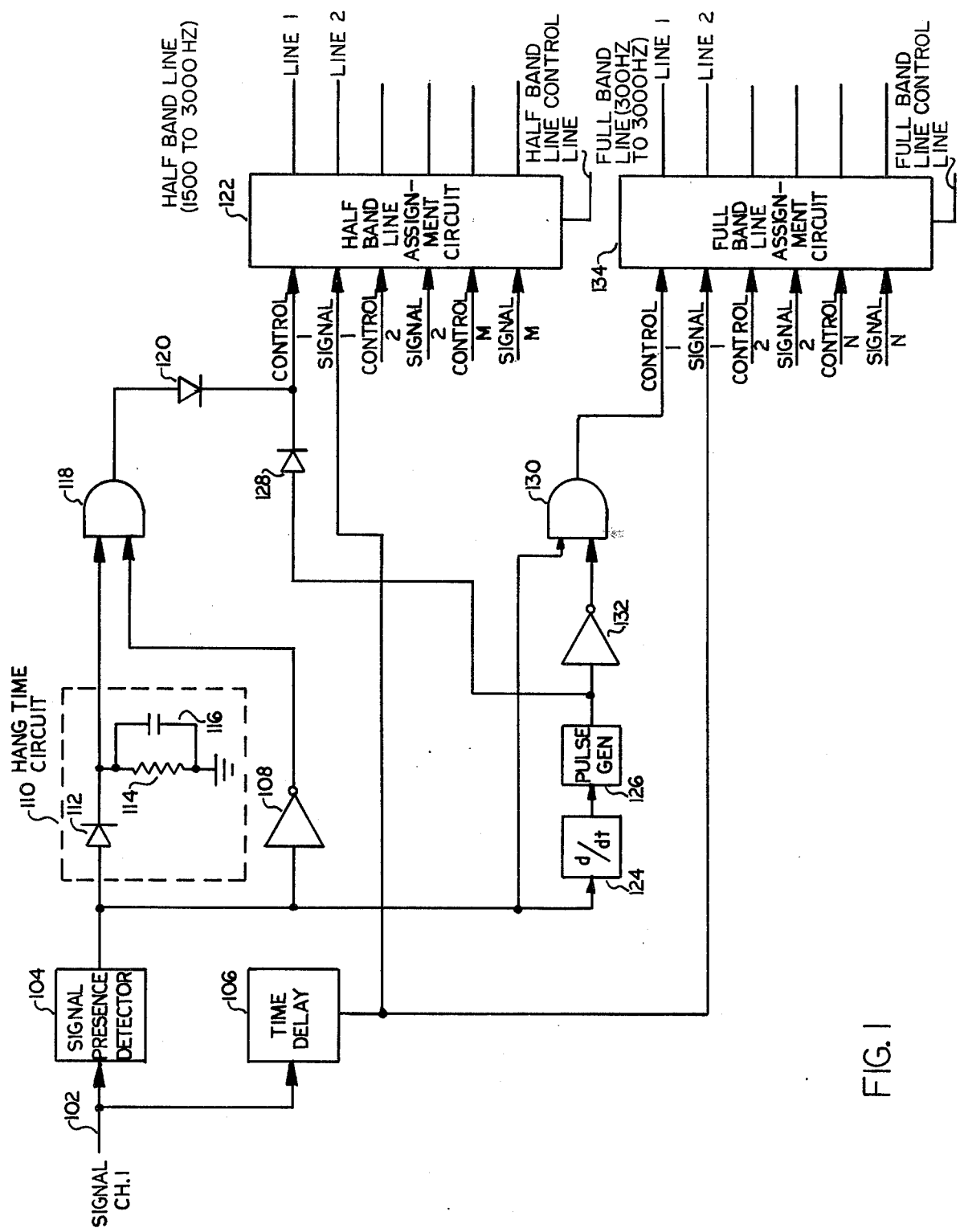
FIG. 1 shows a circuit of a TASI type system incorporating the improved circuitry for reducing loss of consonant speech sounds.

FIG. 1 shows an embodiment of the invention as applied to a TASI type system. Line 102 is connected to the Channel 1 voice circuit. Line 102 feeds time delay circuit 106 and also a signal presence detector 104 which, in turn, feeds a hand time circuit comprising diode 112 and RC circuit 114 and 116. The detector 104 produces a positive voltage whenever a voice signal is detected, and it feeds hang time circuit 110. The output of the hang time circuit 110 feeds AND Gate 118. Also feed AND Gate 118 is the output of signal presence detector 104 after inversion by inverter 108. Thus, AND Gate 118 produces a positive voltage whenever hang time circuit 110 output voltage is above a predetermined amount and voltage is absent from signal presence detector 104. Thus, AND Gate 118 produces a positive voltage during the period just following the indication of signal presence. The output of the AND Gate 118 passes through an OR Gate composed of diodes 120 and 128. The output of the OR Gate feeds control voltage which passes the information regarding the status of Channel 1 to the narrowband line assignment circuit 122. Circuit 122 functions in the same fashion as a conventional TASI control circuit and assigns the various circuits to available lines.

By this procedure, a signal path is provided for weak sounds immediately following the speech presence indication. However, under normal conditions such speech sounds will be constant sounds, and, therefore, only transmission of high frequency components is required. Accordingly, instead of assigning full lines having a response of 300 to 3,000 Hz, half band lines are used having a response of 1,500 to 3,000 Hz.

In order to handle the consonant sounds which initiate speech bursts, the signal is passed through time delay circuit 106, providing time for the system to activate the necessary control circuits. The undelayed signal activates signal presence detector 104 and the output of block 104 is differentiated by differentiation circuit d/dt 124. This produces a trigger pulse which triggers pulse generator 126 causing it to produce a pulse having a duration equal to the value of the delay of time delay 106. This positive pulse is passed through OR Gate 128-120, and this pulse causes the half band line assignment circuit to provide a path for the early consonant sounds.

The delayed voice signals are also passed to full band line assignment circuit 134. This circuit assigns a full line to Channel 1 when AND Gate 130 is fed a voltage indicating signal presence from detector 104 and a positive voltage from inverter 132. A positive voltage from inverter 132 indicates that the pulse from pulse generator 126 has expired and that the initial consonant circuit has finished its control function of assigning a particular half band line. Both the half band assignment circuit 122 and the full band assignment circuit 134 must be assigned control line channels to provide a path to the necessary receive end circuitry. It should be noted N the number of full lines assigned to the system is much larger than M the number of half lines.

Blocks 122 and 134 can utilize circuitry commonly used in conventional TASI systems. This block assigns the transmission circuits to the various voice circuits as the circuits become active, and also generates control information which is transmitted to the receive end of the system via the control line.

At the receive end of the circuit two switching systems corresponding to 122 and 134 connect the full and half lines to the appropriate voice circuits in a similar fashion to a conventional TASI system.

As mentioned above, circuit 122 assigns channels to half bandwidth lines covering a range of 1,500 to 3,000 Hz. These lines are assigned to the channels for a period equal to the time delay value at the initiation of voice activity and at the end of activity for a predetermined period which is the value set into the hang time. It is sometimes desirable to use half bandwidth lines covering a different range of frequencies; i.e., 2,000 to 3,500 Hz, so as to favor different components.

The time delay introduced by block 106 is a compromise between insuring the transmission of the complete consonant sounds initiating speech bursts and the introduction of significant time delay into the telephone system. It has been determined by subjective testing that an individual becomes disturbed by echo effects in normal two way telephone conversations when there is a delay in excess of approximately 40 milliseconds inserted into the system. Therefore, under most conditions the time delay should not be greater than approximately 40 milliseconds if echo suppressor systems are not utilized. On the other hand, it has been reported (see, for example, Telecommunications by Speech, D. L. Richard, Halsted Press Divison, John Wiley & Sons, N.Y., Page 71) that the initial consonants have a time duration from 70 to 250 milliseconds and average about 120 milliseconds. Therefore, the designer of such systems may select a time in the range of 40 to 250 milliseconds but probably closer to the low range; i.e., 40 to 60 ms, for two-way conversation circuits.

On the other hand, when the invention is applied to a oneway conversation system; for example, radio news reports, etc., the full time delay of 250 milliseconds covering the longest initial consonant sound may be used. It should be noted that this compromise problem between time delay insertion and accommodation of complete consonant sounds does not enter into the treatment of final consonant sounds. In other words, it is unnecessary to introduce additional time delay to accommodate the final consonants, and it is only necessary to increase the hang time of the system. The final consonants have a duration of between 100 and 350 milliseconds, and average about 190 milliseconds; therefore, in order for the system to insure transmission of these components, the pulse generator discussed below and identified as 126 should produce a pulse having a duration of 350 milliseconds plus the time delay amount introduced by time delay network 106. However, it should be noted that the longer the pulse duration, the lower the spectrum utilization efficiency and therefore, the pulse duration should not be longer than necessary to accommodate speech sounds.

An important advantage in providing the time delay circuit and the hang time circuit is that it allows the operator of this equipment to reduce the sensitivity of the speech presence detector. He can reduce the sensitivity because he can be assured that, even though the speech detector does not actually sense the presence of some of these weak sounds, the equipment will service them.

Figure 2:
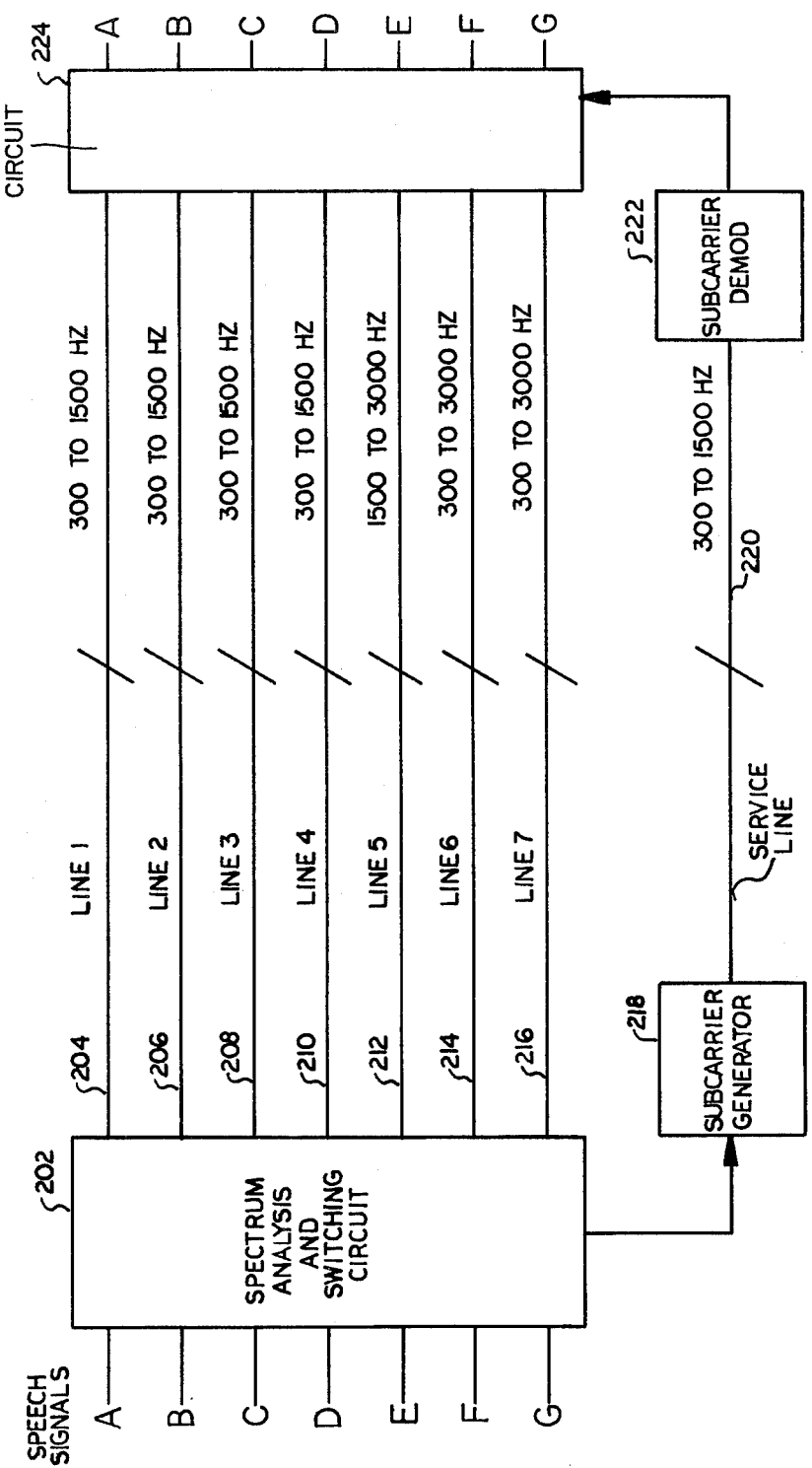
FIG. 2 illustrates an embodiment of this invention utilizing a number of band limited lines for the transmission of a greater number of telephone circuits.

FIG. 2 is a block diagram showing a method for improving the utilization of a plurality of channels in transmitting a plurality of signals over a multiplicity of lines having substantially different frequency response characteristics. In this arrangement the characteristic of the transmission circuit assigned to transmit a particular signal at a particular instant is selected so as to match the response characteristic of the transmission facility with that of the signal. Thus, when processing high frequency sounds which are devoid of low frequency components, the system selects a channel having only high frequencies response. When a signal having only substantial low frequency components is present the assigned transmission circuit will have the desirable low frequency response but it will have little or no high frequency response. Some sounds have both high and low frequency components and in this case a line having both reasonably high and low response is used.

The lines used in FIG. 2 may actually be conventional narrowband voice grade circuits having a response of 300 to 3,000 Hz but most of these lines are divided so that a given line may carry the low frequency components of one signal while simultaneously carrying high frequency components of a second signal or the line may be used with multiplex equipment so that it handles two 300 to 1,500 Hz signals. Lines 1 to 5, shown in FIG. 2, would require the use of 2½ full lines.

FIG. 2 is a voice transmission version of this embodiment of the invention and it is seen that the seven speech signals are fed to a spectrum analysis and switching circuit 202. Each of the signals spectrum is analyzed so as to determine whether high frequencies predominate, low frequencies predominate, or whether a relatively wideband signal having both high and low frequency components is present.

Figure 5:
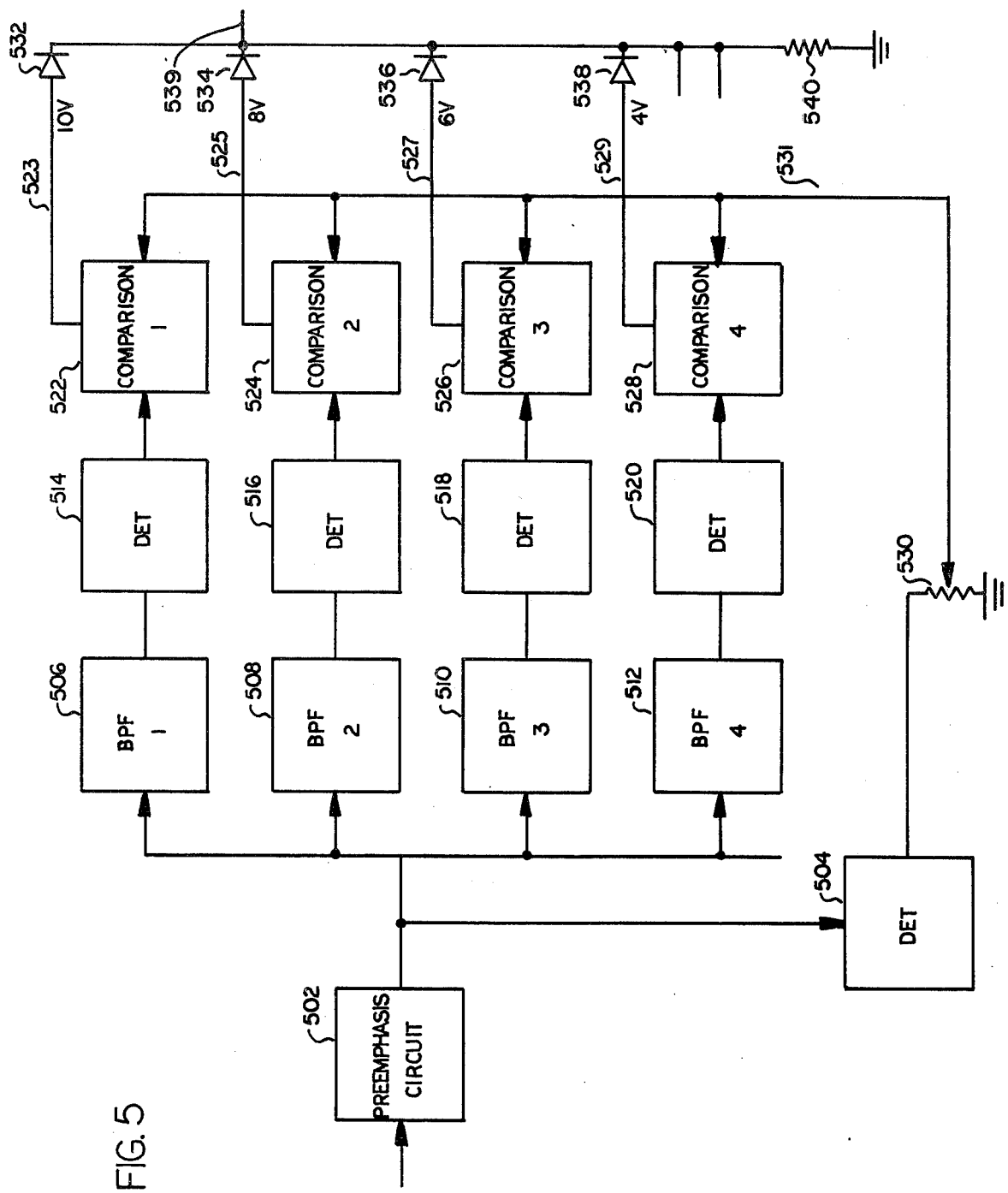
FIG. 5 is a block and schematic drawing of a system for analyzing a speech wave to help determine its frequency characteristics.

The circuit shown in FIG. 5 can be adapted to make a determination of both the high and the low frequency characteristics of the signals and a small number of filters would be adequate. Actually, a simpler system utilizing two bandpass filters, one covering 300 to 1,500 HZ and a second 1,500 to 3,000 Hz for each signal with associated detectors and comparision circuits, can be used to provide proper control the line switching circuit part of block 202. The result of the signal's analysis causes the switching circuit to operate so as to make the proper signal-line assignments; i.e., a signal having, say, predominantly high frequency components is assigned to line 5, and signals having predominantly low frequency characteristics at a given instant is assigned to one of the first four lines. In case a speech sound has both strong, high and low frequency components, lines 6 or 7 would be selected.

It should be noted that more lines are assigned to the low frequency sounds than high frequency sounds. This is generally true of English speech. The actual percentage of each type of circuit provided in such equipment would be a function of the language, sex, and age of the people who are expected to use the equipment. It is also a function of the type of messages. For example, a salesman describing "stylish synthetic silk sports shirts" may well use more high frequency sibilant sounds than the average speaker.

A subcarrier generator 218 is modulated by information concerning the line/signal assignments and this subcarrier wave is then passed through a service line 220 and this wave is demodulated by subcarrier demodulator 222 which in turn switches the lines to the appropriate signal output ports of switching circuit 224 properly connecting utilization circuits A to G.

The service line 220 used for transmitting the subcarrier signal may hve a fairly narrow frequency response as it only handles relatively slow speed data as speech sounds do not vary rapidly in their frequency characteristic and therefore the line assignment need not be changed rapidly.

Of course, the embodiment shown in FIG. 2 may be altered so as to utilize more lines to improve the low frequency and high frequency response of the signal channels rather than use less lines to achieve 300 to 3,000 Hz quality transmission.

The system may also be used to augment conventional TASI systems or the improved TASI system shown in FIG. 1 which assign telephone circuits according to whether the speech is present or not. If the instant invention is used in conjunction with TASI an even higher utilization of the channels will be achieved because not only will the efficiency of the TASI system be enjoyed but also improved efficiency will be achieved when speech is present by using the active lines more efficiently.

Figure 3:
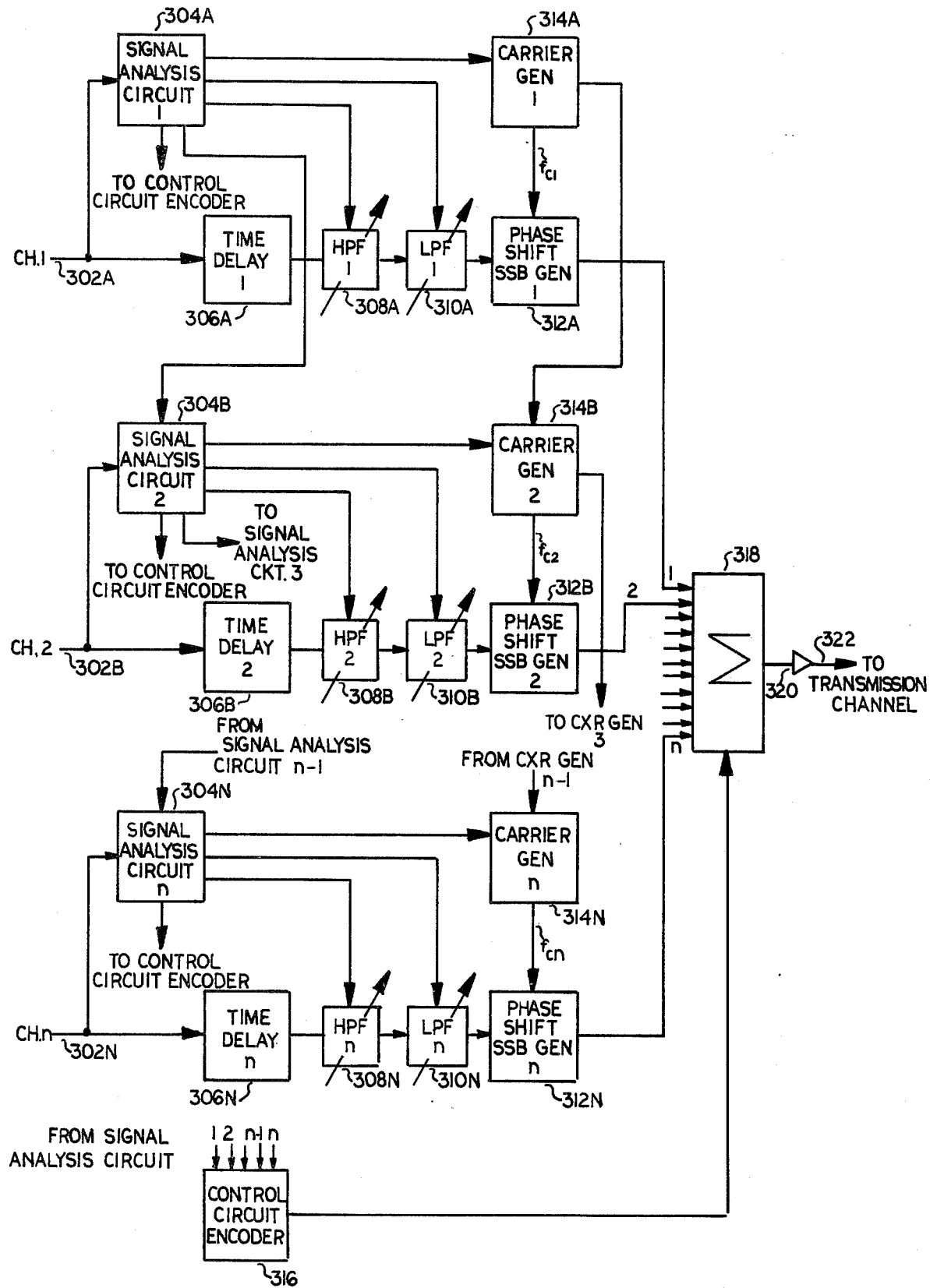
FIG. 3 shows the transmitting end of another embodiment of this invention utilizing a single wideband channel used for transmitting a plurality of telephone channels.

FIG. 3 is a block diagram of the transmission portion of the embodiment of the present invention structured to utilize a wideband transmission channel. The telephone channels are identified by numbers, 1, 2, ... to N-1 and N. N can be any number greater than 1; however, in most applications, the number of channels will be large; i.e., in the order of 100 to 200.

Channel 1 is connected to line 302A which in turn feeds the telephone signal to a signal analysis circuit 304A. Signal analysis circuit 304A analyzes the telephone signal so as to determine the required frequency characteristics of the channel used to transmit the signal. In other words, analysis circuit 304A determines whether a full bandwidth channel is required and, if not, what limited bandwidth will handle the telephone circuit at a given period of time. One arrangement for analyzing a speech wave is shown in FIG. 5. Signal analysis circuit 304A also incorporates a signal presence detector circuit so that when signal is absent the bandwidth reserved for the channel can be reduced to zero.

Also, in accordance with this invention, a transmission path may be provided which passes consonant speech sounds slightly before and slightly after the determination that signal is present. This facility can be provided in order to avoid loss of low amplitude consonants speech sounds. In order to provide this facility, time delay circuit 1,306A to 306N is required as well as a hang time circuit which is incorporated as part of signal analysis circuit 304A to 304N. A description of this circuitry is included in the above sections describing the operation of FIG. 1, especially blocks 106, 110.

The output of the signal analysis circuit controls a number of circuits including a highpass filter 1, 308A, and a lowpass filter 1, 310A. These filters set the limits of the frequency response of the system for Channel 1 at a given instant of time. The two filters are fed by time delay 1, 306A. The time delay network is provided to allow the signal analysis circuit time to operate and also to provide time for the system to respond to consonant sounds prior to the initiation of a speech detection indication in block 304A.

The switchable highpass and lowpass filters can be constructed according to a number of techniques. One preferred technique would utilize active filters and the design of such filters is described in numerous textbooks; for example, "Rapid Practical Designs of Active Filters" by D. E. Johnson and J. L. Hilburn, published by John Wiley & Sons, Inc., New York 1975.

The output of lowpass filter 1, 310A, feeds a phase shift type SSB suppressed carried generator 312A. This type of SSB generator is well known to those skilled in the art and utilizes constant amplitude constant phase difference networks. Such generators have been discussed in a number of textbooks and papers including, "The Phase Shift Method of Single-Sideband Generation" by D. E. Norgaard, Proc. of the IRE, December 1956, pages 1718 to 1735.

Besides the audio input from LPF-1, a carrier wave is fed to phase shift generator 312A from carrier generator 1, 314A. This carrier generator shifts frequency according to the character of the signal transmitted over Channel 1. Actually, the carrier frequency is set slightly below the band edge of the transmission channel by a frequency equal to the setting of highpass filter 1, 308A.

Since the phase shift SSB generator 1 produces an SSB suppressed carrier wave, the actual carrier frequency $f_{cl}$ is not passed by the system. However, its frequency is set so as to place the low frequency edge of Channel 1's signal at, or close to, the low frequency edge of the wideband transmission channel. In this fashion, Channel 1 occupies a band just sufficient to pass its lowest frequency components determined by signal analysis of circuits 304A and which controls the frequency characteristics of highpass filter 1, 308A. The high frequency band of Channel 1 signal is set by LPF-1, 310A.

Channel 2 operates in a similar fashion, but carrier frequency $f_{c2}$ is not only a function of Channel 2's frequency characteristic at a given instant of time, but it is also a function of carrier frequency $f_{cl}$ as well as the high frequency cutoff of Channel 1. Thus, the Channel 2 signal is placed so as to allow sufficient bandwidth for Channel 1 as well as a guard band. The width of the guard band is a function of the sharpness of the filters used in the system, and a guard bandwidth of approximately 200 Hz would be suitable for many systems.

Channel 2's input signal is connected to line 302B which feeds signal analysis circuit 2, 304B. Also feeding this signal analysis circuit is information from the signal analysis circuit 1, 304A. Thus, information as to the short term frequency characteristic and channel activity of Channel 1, is used in addition to information concerning Channel 2's short term characteristics to set the response of highpass filter 2, 308B and lowpass filter 2, 310B. The telephone signal from line 302B feeds time delay 2 circuit, 306B. This time delay circuit serves the same purpose as the time delay circuit 306A and should have the same characteristics.

The output of the time delay network feeds highpass filter 308B which in turn feeds lowpass filter 310B. The output of 310B feeds phase shift generator 2, 312B, which generates an SSB suppressed carrier wave. Carrier generator 2 generates a frequency determined by the signal analysis performed in 304B and also the carrier frequency of 314A.

The variations in cutoff frequency of the highpass filters 308A to 308N and the cutoff frequency of lowpass filters 310A to 310N may be continuous or quantized. The use of quantum steps generally reduces the cost of the filters, the control encoder, and also the control decoder. Furthermore, the use of quantum steps in the control reduces the bandwidth of the channel assigned to transmit the control signals. One set of values for the cut-off frequency of the highpass filters would be 0.25, 0.8 and 2 kHz and 1.5, 2.5 and 3.8 kHz for the lowpass filters. Using these figures and a guard band of 200 Hz, the following carrier frequency settings would be appropriate:

Assuming that the low edge of the transmission channel is 30 kHz, and the upper sideband is selected for each SSB generator then for Channel 1 low frequency response 0.25 kHz and high frequency response 3.8 kHz and Channel 2 low frequency response 0.8 kHz and high frequency response 2.5 kHz:

$$f_{cl} = f_{edge} - f_{L1} = 30 \text{ kHz} - 0.25 \text{ kHz} = 29.75 \text{ kHz}$$

$$f_{cm} = f_{cm-1} - f_{Hm-1} - f_{Lm} + f_{guard}$$

$$f_{c2} = f_{cl} + f_{h1} - f_{L2} + f_{guard} = 29.75 + 3.8 - 0.8 + 0.2 = 32.95 \text{ kHz}$$

where m is the channel number for all channels other than Channel 1, $f_{edge}$ is the low frequency edge of the transmission channel, $f_{L1}$ is the desired low frequency response of Channel 1 at a given instant, $f_{Lm}$ is the desired low frequency response of the $m^{th}$ channel at a given instant, $f_{Hm-1}$ is the desired high frequency response of the $m-1$ channel, at a given instant, and $f_{guard}$ is the guard bandwidth:

If a channel is inactive then its carrier frequency equals the next lower channel's carrier frequency. Thus, if Channel 2 is idle, its carrier frequency should be equal to that of Channel 1; i.e., 29.75 kHz for this example.

The setting of the cutoff frequency of the high and the lowpass filters would match the above figures; i.e., the cutoff frequency for Channel 1 highpass filter 308A would be 0.25 kHz and Channel 2 highpass filter 308B would be 0.8 kHz. The cutoff frequency of the lowpass frequency filters 310A and 310B would be 3.8 kHz and 2.5 kHz respectively.

If the channel is idle in this embodiment, carrier frequency $f_{c2}$ would be set equal to carrier frequency of Channel $f_{c1}$, so that Channel 2, during idle periods, does not use up any spectrum space. It should be noted that carrier generator 2 feeds information to the carrier generator 3. The other channels operate in a similar fashion, except Channel N, which, being the last channel, does not pass signal analysis information to any other channel.

The information as to each signal's frequency characteristic and activity status, as determined in signal analysis circuits 304A to 304N, must be transmitted to the receive end of the system. Therefore, each of the analysis circuits 304A to 304N feeds control circuit encoder 316. This encoder provides an encoded signal suitable for transmission over the wideband transmission system to the receiving point and is combined with the output of all of the SSB suppressed carrier generators 312A to 312N in summation circuit 318. The output of this linear summation circuit feeds amplifier 320 which in turn is connected to line 322 feeding the wideband transmission channel.

Figure 4:
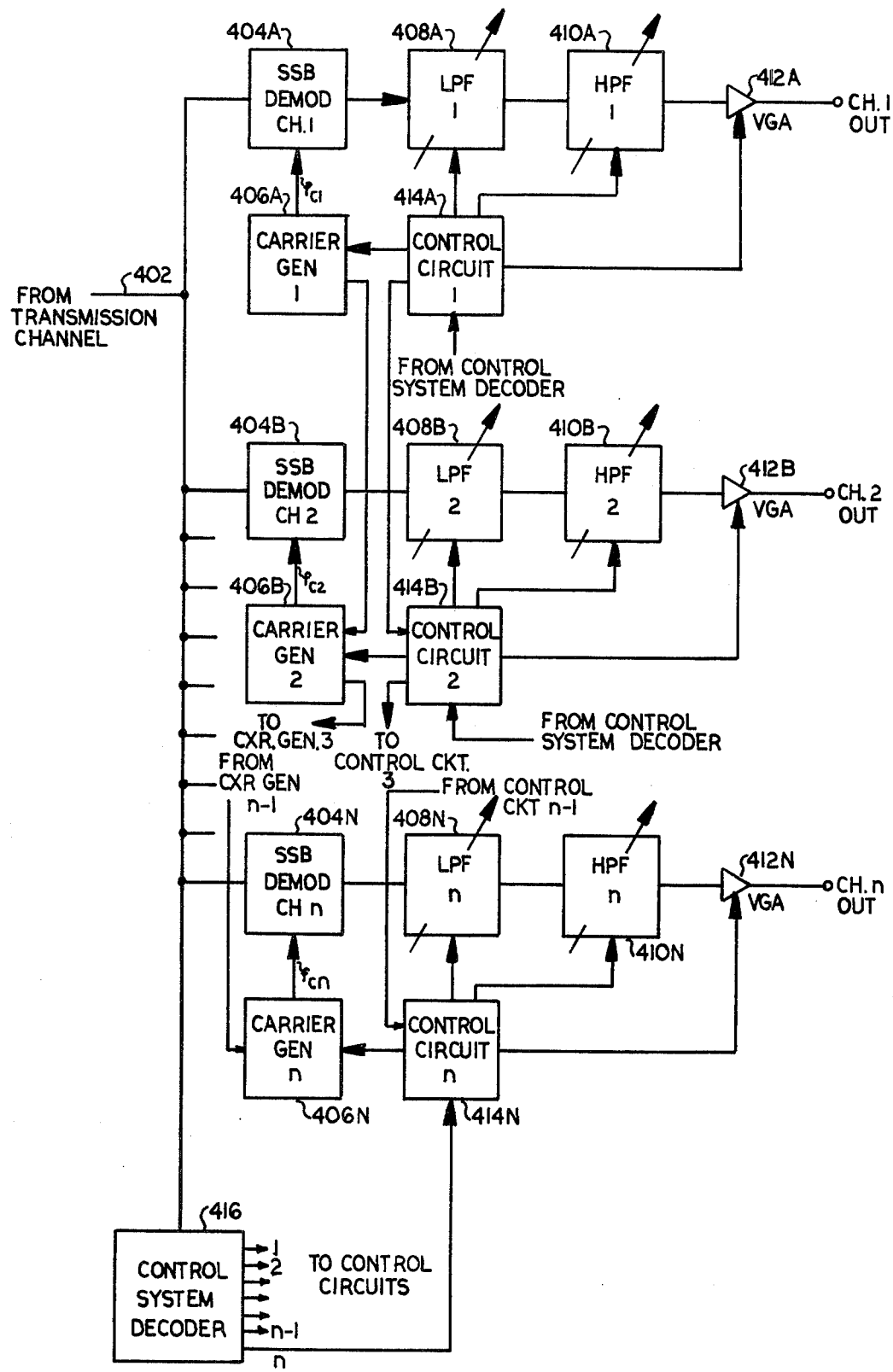
FIG. 4 shows the receiving end of system shown in FIG. 3.

FIG. 4 shows, in block form, the circuitry required at the receive end of the circuit required to accommodate the transmission system of FIG. 3. The transmission line is connected to line 402 which feeds the various demodulators and also control system decoder 416. This decoder decodes the wave produced by encoder 316 of FIG. 3 and produces control information for the various N channels. Examining the operation of Channel 1, it is seen that the transmission channel, as connected to line 402, feeds an SSB demodulator 404A. This demodulator would typically take the form of a phase shift type SSB demodulator as known to those skilled in the art and as described in, Proc. of the IRE, December 1956, "The Phase Shift Method of Single-Sideband Reception", by D. E. Norgaard, pages 1735 to 1743.

Assuming that the transmitted SSB waves of FIG. 3 occupy the upper-sideband and that there is no frequency inversion in the transmission channel, the SSB demodulator 404A selects this same sideband. Carrier generator 406A also feeds the SSB demodulator Channel 1, 404A. The frequency of the carrier is set by information from the decoder 416 which feeds control information to control circuit 1, 414A. The control circuit 414A, in addition to controlling the carrier frequency $f_{c1}$ also controls lowpass filter 408A and highpass filter 410A. It should be recognized that the lowpass filter, highpass filter, and carrier generator also should be altered in synchronism with the corresponding filter 308A, lowpass filter 310A, and carrier generator 314A of FIG. 3.

By this procedure, the original signal is recovered after passage through what is often a relatively narrowband frequency segment. The output of the SSB demodulator, 404A, feeds the adjustable lowpass filter 408A, which in turn feeds the adjustable highpass filter 410A. The output of filter 410A feeds a variable gain amplifier 412A. It is desirable that 412A be a variable gain amplifier so that during instances when telephone channel 1 is idle momentarily little or no noise is passed to the listener of this channel. Therefore, variable gain amplifier 412A is controlled to reduce its gain whenever Channel 1 is idle.

In a similar fashion, Channels 2 to N are controlled by control system decoder 416 to optimally demodulate their respective channels. It should be noted that the various carrier generators are set according to information in their respective control circuits and also the lower order carrier generator frequencies and control circuit information.

The setting of carrier generators 406A to 406N must be within a few Hertz of their corresponding carrier generators 314A to 314N.

When a given channel is idle due to gaps or pauses in the speech wave, a number of procedures may be used in controlling the channel carrier frequency and the setting of the cutoff frequencies of the high and lowpass filters.

One acceptable arrangement would transmitted to set the idle channel's carrier frequency to the same value as the frequency of the preceding channel. In the receiver, a gate or variable gain amplifier should be provided and controlled off when the channel is inactive so as to minimize noise and interference. If the output of the inactive channel is fully cut off, of course, the setting of the filter's cutoff frequency is of little concern.

A basic advantage to the system shown in FIGS. 3 and 4 over the systems shown in FIGS. 1 and 2, is that the system is more flexible and can switch its characteristics to better fit the requirements of the speech channel. For example, if at a given instant the signals being transmitting over the sytem of FIG. 2 cause an inordinately large requirement for the high frequency channels, the structure will overload. Whereas the system shown in FIGS. 3 and 4 can adapt its characteristics to fill the unusual requirement as long as the summation bandwidth required of the individual channels plus their guard band does not exceed the total bandwidth of the transmission channel.

Stating this in another manner, the amount of bandwidth requirement for the system in FIGS. 3 and 4, can be more efficiently utilized because of its improved flexibility.

In many situations it is inconvenient to procure a wideband communications link, and in such situations an alternative arrangement may be used. In U.S. Pat. Nos. 2,576,115 and 3,696,298 methods have been described for transmitting a wideband voice or music wave over two or more narrowband voice grade circuits. Such arrangements might be used as a means for avoiding the use of a single wideband circuit. However, because systems utilizing the techniques disclosed in these patents have cuts or breaks in the passband, serious distortion may occur when a signal component happens to fall in the region of these cuts. Patent application Ser. No. 621,669 discloses a means for avoiding such cuts and would be a preferred method for avoiding the "cut" problem.

Thus, the special processing described in patent application Ser. No. 621,669 would be used by incorporating the encoding means of that application on the wideband wave appearing at line 322 of FIG. 3 and a plurality of narrowband lines would be used instead of the single wideband line. At the receive end of the system the narrowband lines would feed the special circuitry disclosed in patent application Ser. No. 621,669 and the output of that system would feed line 402 of FIG. 4.

It is within the scope of this invention to equip all or a portion of the narrowband channel combining circuits with automatic dialing equipment which is activated whenever an additional channel is required. This procedure avoids tieing up transmission facilities when they are not required.

FIG. 5 shows one possible method for accomplishing the basic function of frequency discrimination of the highest or lowest frequency substantial level component for use in FIG. 2 of FIG. 3. In the configuration shown in FIG. 5, discrete steps of voltage are produced as signal components fall within various frequency segments. It is also possible to use linear frequency discriminators in each frequency segment so as to achieve a continuous measurement of frequency instead of the steps of frequency measurement. However, for most applications, determination of the exact frequency is not important as long as a reasonable approximation is made.

The description covers the high frequency version of the discriminator which may be used in conjunction with a low frequency adaptation of the circuit to provide a complete frequency analysis of speech waves. For use as a low frequency discriminator, or for other types of signals such as video signals, the center frequencies and bandwidths of BPF 506, 508, 510 and 512 must be suitably changed.

The input wave is fed to a pre-emphasis circuit 502, which tends to favor the higher frequency components. The shaping of the pre-emphasis curve is not critical and is a function of the type of signal used; i.e., whether it is voice or video, etc. For most applications, it should follow an inverse function of the spectral energy distribution of typical signal waves so as to make the average amplitude at the higher frequency weaker amplitude waves more closely approximate the average of the mid-frequency components. For some applications, including the low frequency application, this circuit may be eliminated and individual level controls in series with filters 506, 508, 510 and 520 may be provided. The output of the pre-emphasis circuit feeds four filters as in FIG. 5 but 6 to 10 may be preferable for finer control.

These filters are contiguous and would cover a range equal to, say, 1,500 Hz to 3,800 Hz for the system shown in FIG. 3. The 3,800 Hz edge frequency is sufficient to pass most speech components necessary for good intelligibility. The 1,500 Hz edge frequency is equal to the lowest setting of the lowpass filter used in the system illustrated by FIGS. 3 and 4.

The bandwidth of filters 506, 508, 510 and 512 can be made equal in absolute terms or can be made an equal percentage of their center frequency.

The outputs of the filters 506, 508, 510 and 512 are fed to detectors 514, 516, 518 and 520 which in turn feed comparators 522, 524, 526 and 528. The detector outputs are compared with the voltage on line 531 for each of the frequency segments. The voltage on line 531 is generated as follows:

The total wave at the output of the pre-emphasis circuit is fed to detector 504 which produces a dc voltage which is a function of the level of the entire signal. This dc voltage is reduced to a particular percentage by adjustment of potentiometer 530. This adjustment should be made so that the desired high frequency sound levels, as detected by detectors 514, 516, 518 and 520, are just slightly larger than the voltage at line 531 and thus said levels cause the associated comparison circuits to operate. The output of comparison circuits 1 through 4; i.e., blocks 522, 524, 526 and 528 produce voltage of 10, 8, 6 and 4 volts respectively. These voltages are then fed to diodes 532, 534, 536 and 538. For example, if, at a given instant, the speech signal has highest frequency components that fall within the passband or bandpass filter 2, 508 then its associated comparison circuit 524 will produce the highest voltage; i.e., 8 volts which will then pass through its associated diode 534 and back bias diodes 532, 536 and 538 and approximately 8 volts will appear across resistor 540 which is also connected to line 539. If none of the comparison circuits produce voltage, the voltage at line 539 is zero. By this procedure, the output voltage on line 539 is a function of the highest frequency component having substantial level.

The circuit shown in FIG. 5 can be adapted to make a determination of both the high and the low frequency characteristics of the signals and a small number of filters would be adequate. Actually, a simpler system suitable for use in the system illustrated by FIG. 2 would utilize two bandpass filters, one covering 300 to 1,500 Hz and a second 1,500 to 3,000 Hz, each filter with associated detectors and comparison circuits. The result of the signal's analysis causes the switching circuit of FIG. 2 to operate so as to make the proper signal-line assignments; i.e., a signal having, say, predominantly high frequency components is assigned to one type of line and signals having predominantly low frequency characteristics at a given instant is assigned to another type of line. When a speech sound has both strong high and low frequency components a fuller response line would be selected.

While the arrangement shown in FIG. 5 is a suitable means for analyzing the short term spectrum of the voice wave, there are numerous alternatives available to the designer of this equipment, such as frequency discriminators, which are described in standard engineering texts.

In all cases, it is understood that the above described arrangements are merely illustrative of the many possible specific embodiments which represent applications of the present invention. Numerous and other varied arrangements can be readily devised in accordance with the principles of the present invention without departing from the spirit and scope of the invention.

What is claimed is:

1. In a system for transmitting two or more voice signals, incorporating means for sensing the presence of speech and wherein the voice signals are momentarily disconnected from transmission circuits during pauses in speech, the improvement comprising:
   (a) hang time means connected to the speech presence indication means, the hang time means in turn connected to and controlling switching circuitry that provides a substantially frequency limited transmission channel for transmission of unsensed consonant speech sounds that appear at ends of speech bursts; and, (b) means for delaying the speech waves for a period of time sufficient for a listener to hear initial unsensed consonant sounds, said delay means connected so that the speech waves are not delayed in reaching the (a) speech presence determination means but are delayed in reaching said switching circuitry.

2. A system according to claim 1, wherein the hang time of the (a) means is between 100 and 350 ms greater than the time delay of the (b) means.

3. A system according to Claim 1, wherein the time delay of (b) means is between approximately 40 and 250 ms.

4. A system according to claim 1, wherein the frequency limited transmission channel has a low frequency response limited to approximately 1 kHz.

5. A voice communications system comprising:
(a) means for determining the short term frequency characteristic of a voice wave,
(b) means for selecting one circuit from a multiplicity of transmission circuits, some of said circuits having narrow bandwidth frequency response characteristics, according to the (a) determination means,
(c) means for determining the presence of the voice wave,
(d) delay means connected so as to delay a sample of the wave fed to (b) means without substantially delaying the wave fed to (c) means,
(e) gating means for temporarily connecting the delayed voice wave to one of the narrow bandwidth transmission circuits shortly before a voice wave which caused activation of (c) means reaches the output of the delay means and shortly after the (c) means indicated that speech has ceased.

6. A communications system according to claim 5, wherein the (d) delay means provides between approximately 40 and 250 ms of delay.

7. A communications system according to claim 5, wherein the (c) means incorporates a hang time circuit which allows the system to accommodate weak sounds at completion of a speech burst.

8. A communications system according to claim 6, wherein the transmission circuit gated in (e) means is a circuit capable of passing at least a portion of many consonant sounds.

9. A communications system, according to claim 5, wherein the transmission circuit of (e) means passes the higher frequency part of the voice channel.

10. A communications system, according to claim 9, wherein the higher frequency part is specified as above approximately 1 kHz.

11. In a system for transmitting two or more voice signals, wherein the voice signals are momentarily disconnected from transmission circuits during pauses in speech, incorporating means for sensing the presence of speech, the improvement comprising;
hang time means connecting to the speech presence sensing means, said hang time means in turn connected to and controlling switching circuitry that switches in, at the ends of sensed speech bursts, an alternative transmission channel, said channel being relatively frequency limited, for the transmission of unsensed consonant speech sounds which may be present at the ends of sensed speech bursts.

12. A method for transmitting a multiplicity of voice signals comprising;
(a) sensing the presence of voice bursts,
(b) continuously measuring the frequency characteristics of the sensed voice bursts,
(c) altering associated transmission means frequency characteristics to accommodate the measured frequency characteristics of the voice, and
(d) switching the voice signal to transmission means, having a narrowband characteristic immediately following completion of the sensed voice burst so as to accommodate consonant sounds which may, although unsensed, appear after the completion of the sensed speech burst.

* * * * *